United States Patent [19]

Wilson et al.

[11] 4,008,842
[45] Feb. 22, 1977

[54] ELONGATED ARTICLE FEEDING AND DRIVING MECHANISM

[76] Inventors: Robert Burr Wilson, 4912 Mansfield; Steven Maitland Cochran, 4916 Mansfield, both of Royal Oak, Mich. 48073

[22] Filed: Sept. 10, 1975

[21] Appl. No.: 612,100

[52] U.S. Cl. .............................. 227/117; 227/137
[51] Int. Cl.² ...................................... B27F 4/00
[58] Field of Search ............ 227/117, 137; 74/126, 74/142, 577 S

[56] References Cited
UNITED STATES PATENTS

| | | | |
|---|---|---|---|
| 481,653 | 8/1892 | Lombard | 227/117 |
| 618,695 | 1/1899 | Lee | 227/117 |
| 2,479,190 | 8/1949 | Wheeler | 227/117 |
| 3,185,367 | 5/1965 | Rieger et al. | 227/137 |

*Primary Examiner*—Granville Y. Custer, Jr.
*Attorney, Agent, or Firm*—John R. Benefiel; Allen M. Krass; Thomas N. Young

[57] ABSTRACT

A mechanism for receiving elongated articles such as dowel pins, etc., from a bulk source is disclosed which separates the pins and positions them for ejection and insertion by a ram driven driver tool. The mechanism includes a rotary feed cylinder having a plurality of pin receiving chambers extending in directions tending to converge and arranged circumferentially about the feed cylinder axis. The feed cylinder is adapted to receive pins into each chamber via an inlet from the bulk source, while upon rotation about its axis the feed cylinder repositions the pins to be horizontal in the ejection position so to be able to be advanced out of the chamber by means of the driver tool. Rotation and positioning of the feed cylinder is produced by a unique indexing arrangement operated by the driver tool ram, including a ratchet wheel drivingly connected to rotate with the feed cylinder. The ratchet wheel is engaged by an indexing pawl which is in turn oscillated to a cocked position by the driver tool ram and adapted to incrementally advance the ratchet wheel with each stroke of the mechanism upon withdrawal of the driver tool after ejection of an article from a chamber.

6 Claims, 8 Drawing Figures

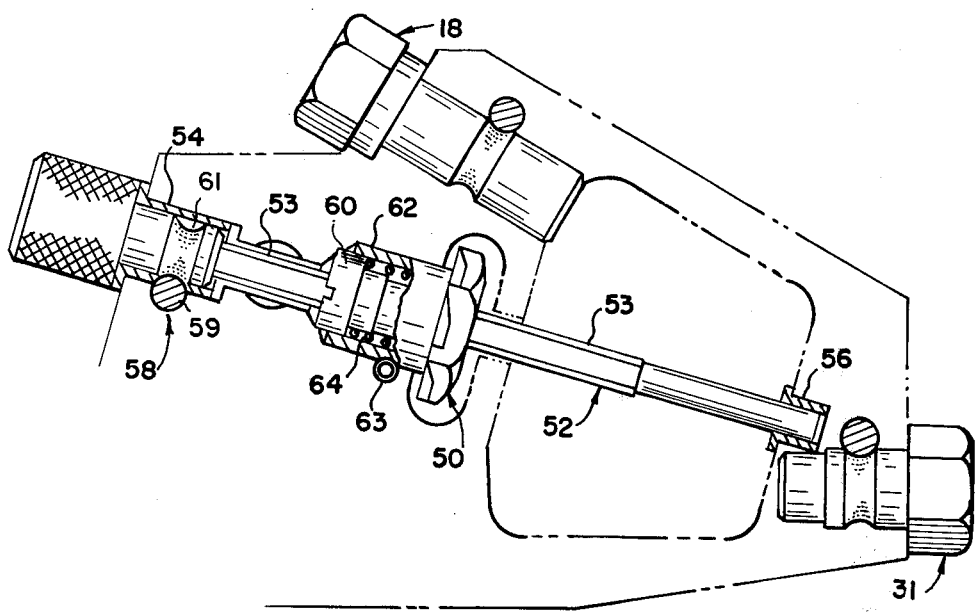
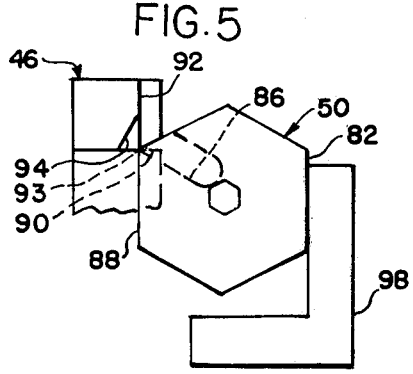
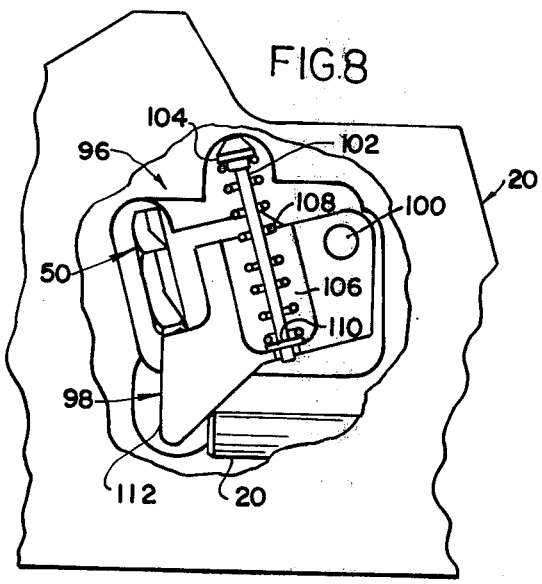
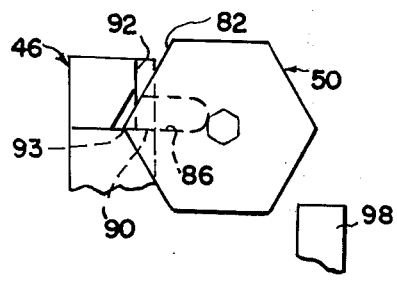
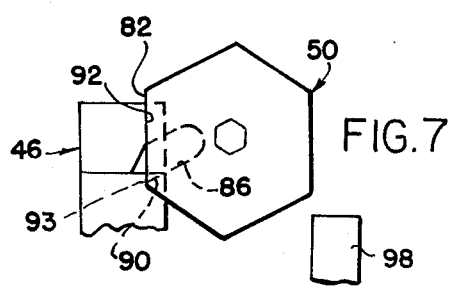

ELONGATED ARTICLE FEEDING AND DRIVING MECHANISM

BACKGROUND OF THE INVENTION

1. Field of the Invention

This invention concerns feeding and driving mechanisms, and particularly such apparatus suited to automatic feeding and insertion of elongated articles such as dowel pins.

2. Description of the Prior Art

Requirements of automated assembly operations dictate that the design incorporated and utilized therein provide maximum simplicity and reliability of operation. Insertion devices for such parts as dowels, stakes, roll pins, etc., typically required an escapement control for separation of the items as they are fed from a bulk source and a separate interrelated control for timing of the driving or insertion mechanism, these controls often being electromechanical in nature, such that combined with the complexity inherent in the design, overall reliability is not high.

Some of these devices have utilized revolving cylinder type feed mechanisms which receive parts from bulk with a driver forcing the parts into the chambers in synchronism with the rotation of the cylinder. This arrangement obviously introduces an additional complexity factor to the design with attendant reductions in the reliability factor.

In some designs a driver operated mechanism is relied on to eliminate the interrelated controls, but the particular indexing mechanisms tend to be complex and unreliable particularly when satisfying a design requirement of such applications that the cylinder be fixed in position at all times except when rotating to prevent inadvertent mispositioning by an operator, which mispositioning could cause destructive accidents.

Accordingly, it is an object of the present invention to provide an insertion device for elongated articles such as dowels which does not require separate interrelated escapement and driver controls and which utilizes a rotary feed cylinder without requiring a force feeding arrangement for loading of the cylinder.

A further object is to provide an indexing mechanism for the rotary feed cylinder of very simple design which insures accurate positioning thereof at all times.

SUMMARY OF THE INVENTION

These and other objects which will become apparent upon a reading of the following specification and claims is accomplished by a mechanism including a rotary feed cylinder having a plurality of pin receiving chambers extending in directions tending to converge and positioned about the circumference of the feed cylinder axis. Upon rotation of the feed cylinder, the pins are repositioned to be horizontal in the driving position so to be able to be advanced out of the chamber by means of the driver tool. Rotation and positioning of the feed cylinder is produced by an indexing arrangement operated by the driver tool ram, including a ratchet wheel drivingly connected to rotate with the feed cylinder. The ratchet wheel is engaged by an indexing pawl which in turn is oscillated to a cocked position by the driver tool ram and adapted to incrementally advance the ratchet wheel with each stroke of the mechanism upon withdrawal of the driver tool after ejection of an article from a chamber.

DESCRIPTION OF THE DRAWINGS

FIG. 2 is a partially sectional side elevational view of a portion of the device shown in FIG. 1.

FIGS. 5–7 are diagrammatic representations of the operating cycle of the elements shown in FIGS. 4 and 5.

FIG. 8 is a side elevational view of an optional mechanism which may be incorporated in the device shown in FIG. 1.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
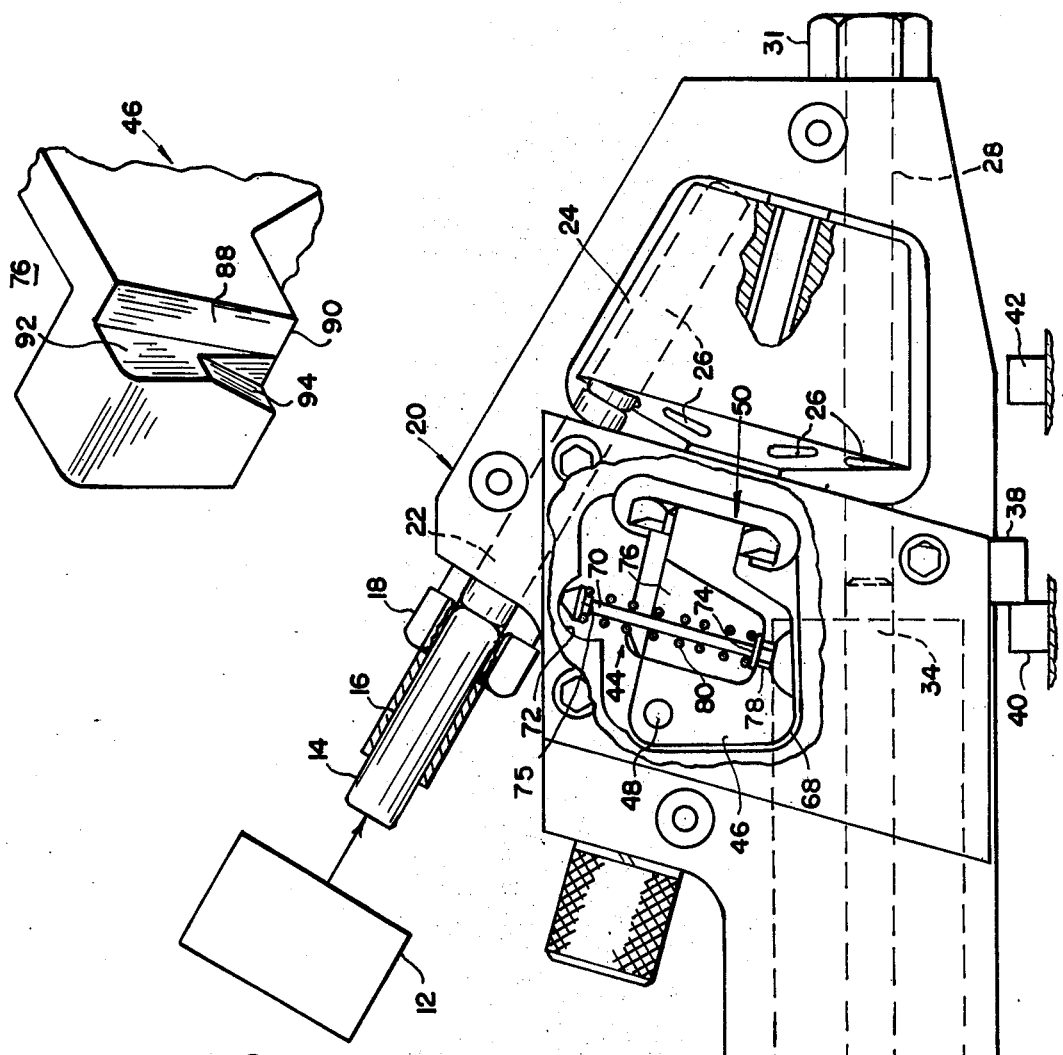
FIG. 1 is a side elevational view of the feeding and driving mechanism according to the present invention partially broken away to show interior details.

Referring to the Drawings, and particularly to FIG. 1, the inserter tool 10 is adapted to receive elongated articles such as dowel pins 14 from a bulk source 12 such as a bowl feeder via a feed tube 16 in which the pins 14 are aligned in end-to-end abutting relationship with each other.

Feed tube 16 terminates at an inlet bushing 18 which secures the feed tube 16 to the inserter tool body 20 in alignment with an internal passage 22 formed therein.

Supported in the tool body 20 is a feed cylinder 24 having a series of pin receiving chambers 26 extending therethrough in directions tending to converge and disposed circumferentially about the feed cylinder 24 axis. Means are provided to rotatably support the feed cylinder with its axis at an angle inclined to the horizontal such that as the chambers rotate through a lower and upper position relative the feed cylinder 24 axis, the angle of inclination of said chambers becomes steeper relative the horizontal. The conical angle of the frustum of the convergency of the pin receiving chambers 26 and the angle at which the feed cylinder 24 is mounted in the body 20 and that at which the internal passage 22 is inclined as well as the other dimensions is such that as each chamber 26 rotates past the internal passage 22 it comes into alignment therewith.

Similarly, an internal bore 28 formed on outlet bushing 31 comes into alignment with each chamber 26, but in this case the bore 28 extends horizontally and in alignment with a horizontal driver means 30 mounted within the tool body 20 adapted to successively eject articles from the chambers 26 when they pass through the lower position referred to above.

The horizontal driver means 30 includes a cylindrical ram 32 slidably fit within the tool body 20 and a tool 34 sized to pass through the chambers 26 and internal bore 28 upon being advanced by the ram 32 along a line of movement extending through any chamber 26 positioned at the lower position. Ram 32 in turn in practice would be adapted to be stroked by means of a hydraulic cylinder (not shown) or some other suitable means.

Adjustment control over the initial position of the insertion process might be required inasmuch as the pin receiving part location could be variable and an arrangement for achieving this is included in the inserter embodiment depicted in FIG. 1. Specifically, the inserter tool body 10 would not be mounted to a stationary structure but rather would be allowed to move with the ram 32 by means of a drag plunger 36 frictionally engaging ram 32 at 37 until an abutment 38 comes into engagement with either stop 40 in the return position or stop 42 in the advanced position. Upon engagement of the abutment 38 with stop 42, ram 32 advances relative the tool body 10 to advance the tool 34 through the chamber 26 in registry moving the dowel pin contained therein out through internal bore 28 into the workpiece or part (not shown).

Similarly, upon return movement, the drag plunger 36 causes the ram 32 and the inserter tool body 10 to withdraw together until abutment 38 engages stop 40, whereupon retraction of the driver tool 34 from the chamber 26 takes place.

It is, of course, necessary that the feed cylinder 24 must be incrementally advanced so that each incremental position chamber 26 is aligned with the driver tool 34 and internal passage 28, and also necessary that the rotation bringing a new chamber into alignment must be synchronized with the ram movement.

These functions are accomplished by an indexing means 44 contained within the tool body 10 and operated by the driver assembly 30.

The indexing means 44 includes an indexing pawl 46 pivotally supported at 48 in tool body 20. Indexing pawl 46 is adapted to engage a ratchet wheel 50 which is rotatably connected to feed cylinder 24 by virtue of a common connection with a stem member 52 having a hex-sectioned portion 53 extending through complementarily shaped openings in both the ratchet wheel 50 and the feed cylinder 24. The oscillation of the indexing pawl 46 about the pivotal support 48 is thus in a plane parallel to the ratchet wheel 50 axis.

Stem member 52 is supported in the tool body 20 in bushing 54 at one end and bushing 56 at the other as shown in FIG. 2, and is adapted to be quickly removed by a quick-release connection 58 comprising an axially moveable pin 59 cooperating with a groove 61 formed in stem member 59 so as to replace the feed cylinder 24 with a different chamber size cylinder.

Ratchet wheel 50 is connected integrally with a tubular stem 60 extending into a bushing 62 retained in the tool body 20 by retainer 63 and slidable with respect thereto against the bias of a compression spring 64 as shown. This arrangement allows limited axial movement required during interaction with the indexing pawl 46 as will be described below.

Indexing pawl 46 is positioned to be oscillated upwardly as viewed in FIG. 1 about connection 48 by a driving engagement with the driver means 30 including rounded corner 68, engaging shoulder 66 formed on ram 32 as it approaches its fully advanced position. This oscillation is against the downward bias exerted by an arrangement including a pin 70 engaging a relief surface 72 formed within tool body 20 and washer 74 positioned on the pin 70 which extends into a relieved area 76 in the indexing pawl 46 and through an opening 78 also formed in indexing pawl 46. A compression spring 80 disposed between washer 74 and shoulder 75 formed on the pin 70 thus acts as a return spring so that upon retraction of ram 32 sufficiently so that tool 34 clears chamber 26 (or the optional latch mechanism is released as will be described below), indexing pawl 46 returns to the position shown in FIG. 1.

Indexing pawl 46 interacts with ratchet wheel 50 to index the feed cylinder 24 to the next chamber position upon each such oscillation of the index pawl 46 and to lock the feed cylinder 24 in the indexed position.

This interaction may be best understood by reference to FIGS. 3–7.

Figure 3:
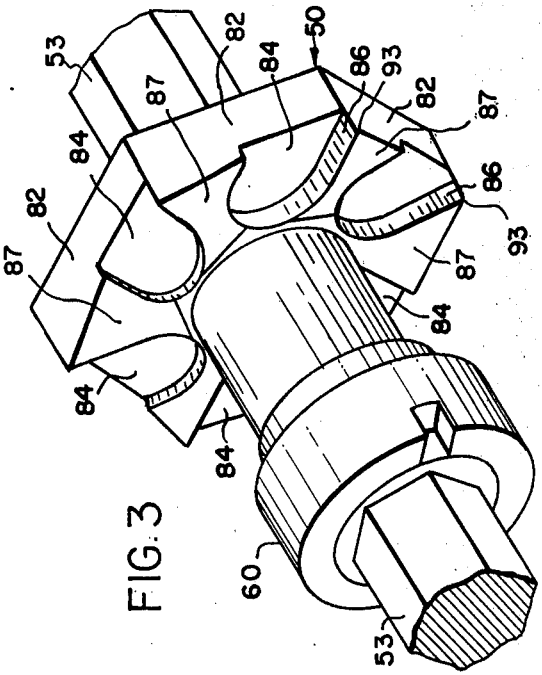
FIG. 3 is a perspective view of a portion of an element of the indexing mechanism incorporated in the device shown in FIG. 1.
Figure 4:
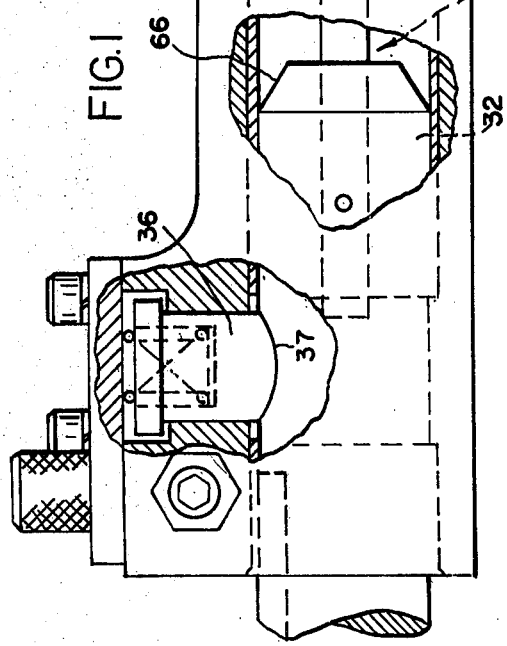
FIG. 4 is a perspective view of another element of the indexing mechanism incorporated in the device shown in FIG. 1.

FIGS. 3 and 4 are enlarged perspective views of the interacting portions of the ratchet wheel 50 and the indexing pawl 46.

Ratchet wheel 50 is formed with a number of flats 82 extending about its periphery, the particular number corresponding to the number of index positions which in turn corresponds to the number of chambers 26 formed in the feed cylinder 24, which is here shown to be six.

Extending into the radial face are corresponding axially relieved pockets 84 with lower index tooth surfaces 86 extending radially inwardly from the corners of the hexagon formed by the flats 82. Intermediate relieved areas 84 are ramp surfaces 87 which slope upwardly to the next index tooth surface 86.

Index pawl 46 is formed with a sloping tooth surface 88 with a leading edge 90 adapted to first engage the outer edge 93 of the corresponding index tooth surfaces 86 and then the tooth surface 86 has a ratchet wheel 50 rotate into the position shown in FIG. 6. Taken together, the tooth surface 88 and the index tooth surfaces 86 provide tooth engagement means therebetween causing the ratchet wheel to incrementally advance upon each oscillation of the index pawl 46.

Cooperating with the flats 82 to provide an abutment means preventing angular rotation producing angular location of the ratchet wheel 50, is a flat 92, which is relieved at 94 to allow rotation of the hex corners during indexing movement as shown in FIG. 6.

This interaction is depicted schematically in FIGS. 5–7. Upon movement of ram 32 to its fully advanced position, the indexing pawl 46 is raised upwardly, tooth surface 90 riding up over a flat 87 while ratchet wheel 50 retracts axially against spring 64 to provide clearance until it reaches the position depicted in FIG. 5. During this movement, reverse rotation of the ratchet wheel 50 is prevented by the driver tool extending through the chamber 26. In this position, the outer edge 94 of a surface 86 engages tooth surface 90 on the index path 46. The tool driver 34, however, extends through chamber 26 so that rotation of ratchet wheel 50 is prevented until the ram 32 is withdrawn sufficiently to clear feed cylinder 24, whereupon the index pawl 46 descends under the influence of spring 80, rotating ratchet wheel 50 and feed cylinder 24 as shown in FIG. 6 until flats 82 and 92 rotate into engagement with each other.

With this engagement, further rotation is prevented, and the relationship of the various parts is such that in this position, the next feed chamber 26 is aligned with internal bore 28, to ready for the next cycle.

As noted above, the tool driver 34 prevents the cycling of the index pawl 46 by virtue of its position within chamber 26 of the feed cylinder 24 until it is withdrawn. If small diameter pins are being inserted, it may be desirable to include a latching mechanism operated by the tool driver 34, such as that depicted in FIG. 8.

This latching mechanism 96 would be disposed on the opposite side of the ratchet wheel 50 as the index pawl 46, and would include a latching element 98 pivotally connected at 100 to the tool body 20. Likewise, it would include an arrangement for biasing the latching element 96 downwardly to the position shown in FIG. 8 including a pin 102 within a recess 104 in the tool body 20 and also a recess 106 in the latching element 98, cooperating with a compression spring 108 and washer 110. Latching element 98 is provided with downwardly projecting tail portion 112 which is contacted by the tool driver 34 so as to be moved upwardly with a portion thereof extending along side a flat 82 opposite that engaged by the index pawl 46 so as to restrain the ratchet wheel 50 against rotation as depicted schematically in FIG. 5. Thus, until driver tool 34 has been retracted, advancement by the cocked index pawl 46 will not take place as in the embodiment described in FIGS. 1–4, but the disengagement point is such that the tool driver 34 at the point of disengagement has withdrawn from the chamber 26 so that no shear strain is exerted by the index pawl 460 The latching element 98 would be withdrawn from engagement with ratchet wheel 50 during indexing movement thereof and immediately thereafter in the positions shown schematically in FIGS. 6 and 7.

Summarizing the operation of the inserter tool particularly the indexing means 44 and the latching mechanism 96, the indexing pawl 46 would initially be in the downward position shown in FIG. 7, with flat 92 formed on index pawl 46 in engagement with the flat 82 formed on the ratchet wheel 50. Latching element 98 would be in the lower position as indicated under the influence of spring 108. Upon initiation of the cycle, the ram 32 is advanced until the tool driver 34 comes into engagement with the tail portion 112, causing the latching element 98 to rotate about pivot 100 moving it upwardly so as to move alongside a flat 82 formed on the ratchet wheel. On further advance of the ram 32, the shoulder 66 formed on ram 32 moves into engagement with the rounded corner 68 formed on the index pawl 46 causing it to rotate about pivot 48 so as to be raised as viewed in FIG. 5. During this movement, tooth surface 90 on index pawl 46 rides up over ramp surfaces 87, with ratchet wheel so moving away axially against the bias of spring 64. The ram then continues to advance into engagement with the pin in a respective chamber 26 driving the same out through the bore 28. Upon retraction, the ram 32 moves out of engagement with the shoulder 68, but the ratchet wheel 50 is restrained from rotating under the influence of the spring 80 by virtue of the positioning of the latching element 98 in juxtaposition with the flat 32 until the tool driver 34 has retracted sufficiently to allow the tail portion to move downwardly as shown in FIG. 8, so that the element 98 moves out of engagement with the ratchet wheel 50 as depicted in FIG. 6 allowing the engagement of the tooth surface 90 formed on the index pawl and the corner 93 formed on a respective tooth surface 86 to rotate the ratchet wheel 50 under the influence of spring 80 to the position shown in FIG. 6 to the position shown in FIG. 7 with the flats 82 and 92 again in abutment. This rotation of ratchet wheel 50 in turn rotates the successive chamber 26 into position opposite the tool driver 34 to ready for the next cycle.

Accordingly, it should be appreciated that the objects of the invention have been provided by the chambers formed in the feed cylinder extending in directions tending to converge which allows gravity feed of the pins while allowing horizontal driving thereof, and by the extremely simple indexing mechanism which consists essentially of only two main elements and is completely free of the need for any external controls for synchronization.

What is claimed is:
1. An article feeding and driving arrangement comprising:
   a tool body;
   a feed cylinder having a plurality of chambers extending in converging directions formed about the feed cylinder axis;
   driver means including a driver tool adapted to be advanced along a line of movement;
   means rotatably supporting said feed cylinder on said tool body with its axis at an angle inclined to the line of movement of said driver tool such that as said chambers rotate through a lower and upper position relative said cylinder axis the angle of inclination of said chambers becomes steeper relative the line of said movement of said driver tool;
   indexing means supported by said tool body and drivingly connected to said feed cylinder indexing said feed cylinder about said axis of rotation;
   passage means formed in said tool body and disposed to guide said articles successively into said chambers at said upper locations;
   said driver means including means supporting said driver tool in alignment with said lower position so as to successively eject said articles from said chamber at said lower position upon advancement along said line of movement whereby said chambers at said upper location may be loaded with articles while articles may be ejected at said lower location.

2. The feeding and driving arrangement according to claim 1 wherein said indexing means includes:
   a rotatably supported ratchet wheel drivingly connected to said feed cylinder;
   an indexing pawl member pivotally supported in said tool body for oscillation in a plane parallel to said ratchet wheel axis of rotation;
   means for oscillating said indexing pawl member about said pivotal support by a driving engagement with said driver means and including means biasing said indexing pawl member against movement induced by said driver engagement with said driver means;
   tooth engagement means including surfaces formed on said ratchet wheel and said indexing pawl member, including a plurality of tooth surfaces corresponding to said plurality of chambers formed on a radial face of said ratchet wheel, and a tooth surface formed on said indexing pawl member said tooth engagement means including means causing said ratchet wheel to incrementally rotate upon oscillation of said indexing pawl by engagement of one of said tooth surfaces formed on said ratchet wheel and said tooth surface formed on said indexing pawl member;
   abutment means comprising a series of flats formed about the periphery of said ratchet wheel corresponding to said successive angular positions and a cooperating abutment surface formed on said index pawl member, each of said flats successively rotating into engagement with said abutment surface upon completion of said incremental rotation of said ratchet wheel, whereby said angular position of said plurality of chambers is located thereby.

3. The feeding and driving mechanism of claim 2 wherein said tooth engagement means comprises axially relieved teeth formed on said ratchet wheel together with ramp surfaces formed thereon intermediate said teeth, said index pawl member being formed with a cooperating tooth surface formed on a leading edge thereof opposite said pivotal support, said indexing mechanism further including means allowing relative movement along said axis of rotation between said ratchet wheel and said index pawl during retracting oscillation of said index pawl member.

4. The feeding and driving mechanism of claim 3 wherein said means oscillating said index member produces said oscillation upon ejection of each of said articles from said chamber.

5. An indexing mechanism for rotating an element through successive angular positions comprising:
   a rotatably supported ratchet wheel drivingly connected to said element;
   an indexing pawl member pivotally supported for oscillation in a plane parallel to said ratchet wheel axis of rotation;
   means for oscillating said indexing pawl member about said pivotal support;
   tooth engagement means including surfaces formed on said ratchet wheel and said indexing pawl member, including a plurality of tooth surfaces corresponding to said successive angular positions formed on a radial face of said ratchet wheel, and a tooth surface formed on said indexing pawl member said tooth engagement means including means causing said ratchet wheel to incrementally rotate upon oscillation of said indexing pawl by engagement of one of said tooth surfaces formed on said ratchet wheel and said tooth surface formed on said indexing pawl member; and
   abutment means comprising a series of flats formed about the periphery of said ratchet wheel corresponding to said successive angular positions and a cooperating abutment surface formed on said index pawl member, each of said flats successively rotating into engagement with said abutment surface upon completion of said incremental rotation of said ratchet wheel, whereby said angular position is located thereby.

6. The indexing mechanism of claim 5 wherein said tooth engagement means comprises axially relieved teeth formed on said ratchet wheel together with ramp surfaces formed thereon intermediate said teeth, said index pawl member being formed with a cooperating tooth surface formed on a leading edge thereof opposite said pivotal support, said indexing mechanism further including means allowing relative movement along said axis of rotation between said ratchet wheel and said index pawl during retracting oscillation of said index pawl member.

* * * * *